United States Patent
Parry et al.

(10) Patent No.: US 7,315,713 B2
(45) Date of Patent: Jan. 1, 2008

(54) METHODS AND APPARATUS OF ELECTRONICALLY CAPTURING USAGE INFORMATION FROM A NON-NETWORKED IMAGING DEVICE

(75) Inventors: Travis J. Parry, Boise, ID (US); Robert Sesek, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 818 days.

(21) Appl. No.: 10/742,298

(22) Filed: Dec. 19, 2003

(65) Prior Publication Data

US 2005/0175240 A1    Aug. 11, 2005

(51) Int. Cl.
    *G03G 15/36*    (2006.01)
(52) U.S. Cl. .............................. 399/182; 399/9; 399/10
(58) Field of Classification Search .................... 399/8, 399/9, 10, 11, 24, 75, 79, 182; 714/48
    See application file for complete search history.

(56) References Cited

U.S. PATENT DOCUMENTS

| 6,587,972 B1* | 7/2003 | Baird et al. .................... 714/48 |
| 6,789,864 B2* | 9/2004 | Phillips ......................... 347/7 |
| 2002/0071137 A1* | 6/2002 | Haines et al. ............... 358/1.15 |
| 2003/0128991 A1* | 7/2003 | Carling et al. ................. 399/8 |

* cited by examiner

*Primary Examiner*—Hoan Tran

(57) ABSTRACT

One embodiment of the present invention provides for a method of electronically capturing usage information from a non-networked imaging device. The method includes generating a printed status report, including the usage information, from the non-networked imaging device, and optically scanning the printed status report to thereby produced an electronic copy of the optically scanned printed status report. The method further includes optically recognizing, from the electronic copy of the optically scanned printed status report, the usage information contained therein. The optically recognized usage information is then converted into digital usage information, and the digital usage information is saved to a computer readable memory device.

29 Claims, 6 Drawing Sheets hp LaserJet 4100mfp series supplies status page

Report Date: November 12, 2003 (20031112)

Cartridge Information

HP Toner level:   50%

| | |
|---|---|
| HP Part Number: | C8061X |
| Toner Low Reached: | NO |
| Toner Out Reached: | NO |
| Estimated Pages Remaining: | 6870 |

Page Count by Paper Size:
| | |
|---|---|
| Legal | 0 |
| A4/Letter | 6417 |
| Customer/Other: | 453 |
| Total Pages Printed: | 6870 |

Pages Printed Since Last Report:   1251

| | |
|---|---|
| Number of Jobs Processed: | 2662 |
| Cartridge Manufacture Date: | 20011203 |
| Cartridge serial Number: | 41167 |
| Marked as Reordered: | NO |

Device Information

| | |
|---|---|
| Total Printer Page Count: | 6847 |
| Preventive Maintenance Interval: | 200000 |
| Pages Until Next Maintenance: | 193159 |
| Device Serial Number: | USLGY05313 |

FIG. 2

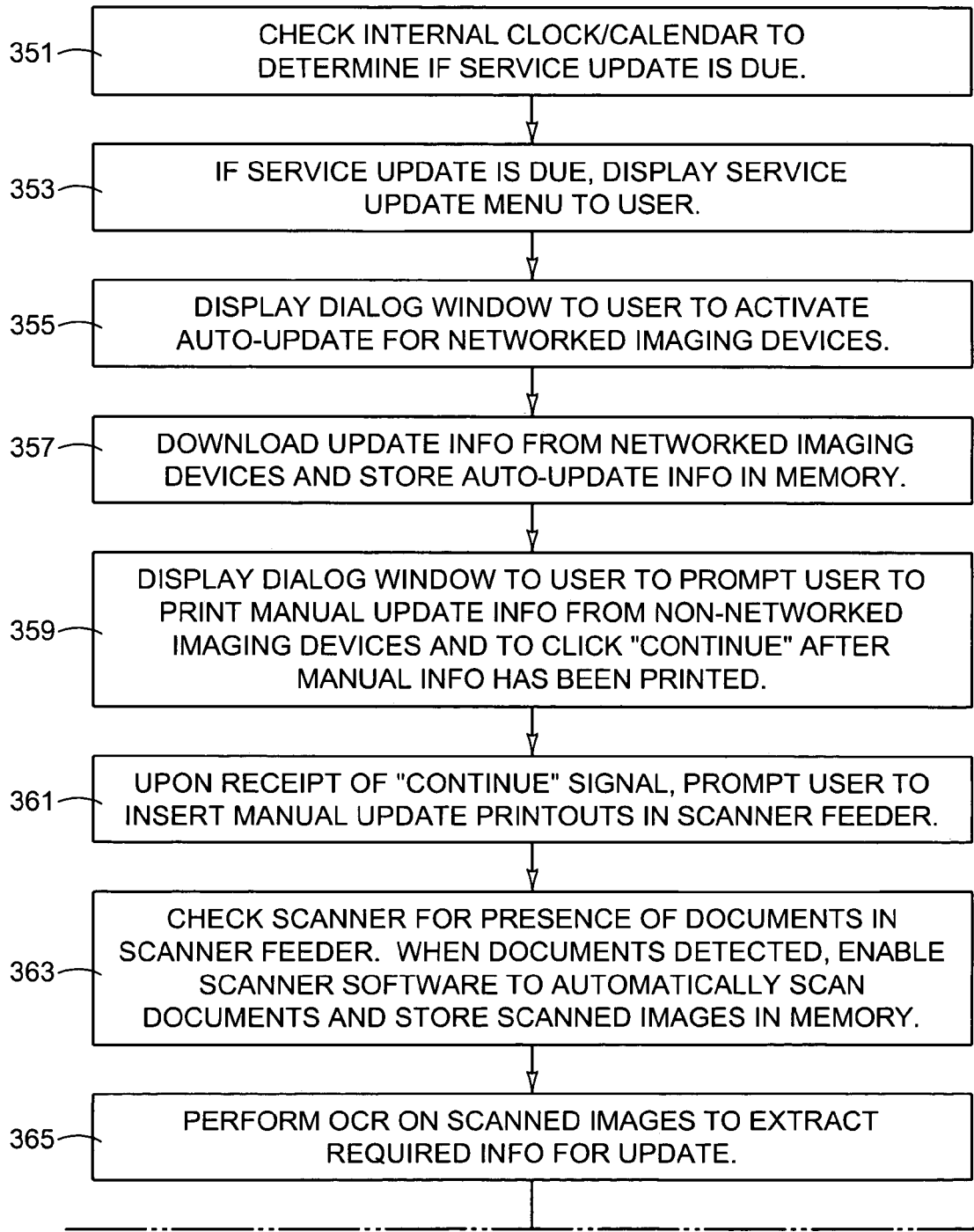

METHODS AND APPARATUS OF ELECTRONICALLY CAPTURING USAGE INFORMATION FROM A NON-NETWORKED IMAGING DEVICE

BACKGROUND

In certain situations, a user (which can be a commercial entity, for example, as well as an individual), acquires computing equipment, including hardware and/or peripheral devices, from a supplier, and the user requests periodic servicing of the hardware and/or peripheral devices, as part of a maintenance agreement. Periodic servicing can be based on regular intervals (such as every six months). However, for peripheral devices where use of the device can vary over time (such, as for example, a printer), it is desirable to base the periodic servicing on the amount of usage of the device, such that when a certain level of usage has occurred, servicing of the peripheral device is recommended. It is, therefore, useful for the supplier to be able to track usage of the hardware and peripheral devices to know when servicing is due.

In other situations, a user can be provided with computing equipment, including hardware and/or peripheral devices, from a supplier under an equipment supply agreement, whereby the supplier continues to own the computing equipment, but provides the equipment to the user on a use-based basis. In such situations, the user is periodically invoiced by the supplier based, at least in part, on the usage of the equipment. Typically, such invoicing is performed at regular periodic intervals.

In such a case, it is thus useful for the supplier to be able to track usage of the equipment to, therefore, know the amount to invoice the user. For example, a supplier can provide a user with imaging devices such as, for example, printers, photocopiers, facsimile machines, and combination devices (known as "multi-function-peripherals", or "MFPs").

The agreement between the user and the supplier can provide that the user will pay the supplier a predetermined amount for every copy printed by the user using the imaging devices. Further, the agreement can provide that the supplier will supply the user with consumables (such as paper, ink, toner, etc.) consumed by the imaging devices based on the consumption or usage of such consumables. Such agreements can include payment terms whereby the user agrees to pay the supplier a monthly amount based, at least in part, on the usage of the imaging devices during the month, as well as the consumables used during the month. The supplier, therefore, needs to be able to track usage of the imaging devices, and consumables consumed, on a periodic basis to, therefore, provide an accurate monthly invoice to the user.

Even where there is no maintenance and/or supply agreement in place between a user of peripheral devices and the supplier of the peripheral devices, it can be useful for the user to periodically track usage of peripheral devices (including imaging devices) for internal audit purposes, as well as other purposes. In such case it is desirable for the user to be able to collectively track the use of all such devices within a particular office or department.

What is needed then is a convenient way to track usage of computer equipment and peripheral devices.

SUMMARY

One exemplary embodiment of the present invention provides for a method of electronically capturing usage information from a non-networked imaging device. The method includes generating a printed status report, which includes the usage information, from the non-networked imaging device. The printed status report is then optically scanned to thereby produce an electronic copy of the printed status report. The usage information contained within the electronic copy of the optically scanned printed status report is then optically recognized and converted to render digital usage information, which can then saved to a computer readable memory device for further processing and/or communication to a service provider.

A further exemplary embodiment of the present invention provides for a system to electronically capture usage information from a non-networked imaging device. The system includes a document scanner, a processor in signal communication with the document scanner, and a computer readable memory in signal communication with the processor. The computer readable memory contains a series of computer executable steps (executable by the processor) to cause the document scanner to optically scan a printed status report generated by the non-networked imaging device and thereby produce an electronic copy of the optically scanned printed status report. The series of computer executable steps are further configured to cause the processor to optically recognize, from the electronic copy of the optically scanned printed status report, usage information contained therein. The series of computer executable steps are additionally configured to cause the processor to convert the optically recognized usage information into digital usage information, and to save the digital usage information to the computer readable memory.

These and other aspects and embodiments of the present invention will now be described in detail with reference to the accompanying drawings, wherein:

DESCRIPTION OF THE DRAWINGS

FIG. 2 is an example of a printed copy of a status report from an imaging device.

FIG. 5 is a legend showing the relationship between FIGS. 5A and 5B.

FIGS. 5A and 5B together are a flowchart depicting steps that can be performed by an imaging device update routine in accordance with a further embodiment of the present invention.

DETAILED DESCRIPTION

Figure 1:
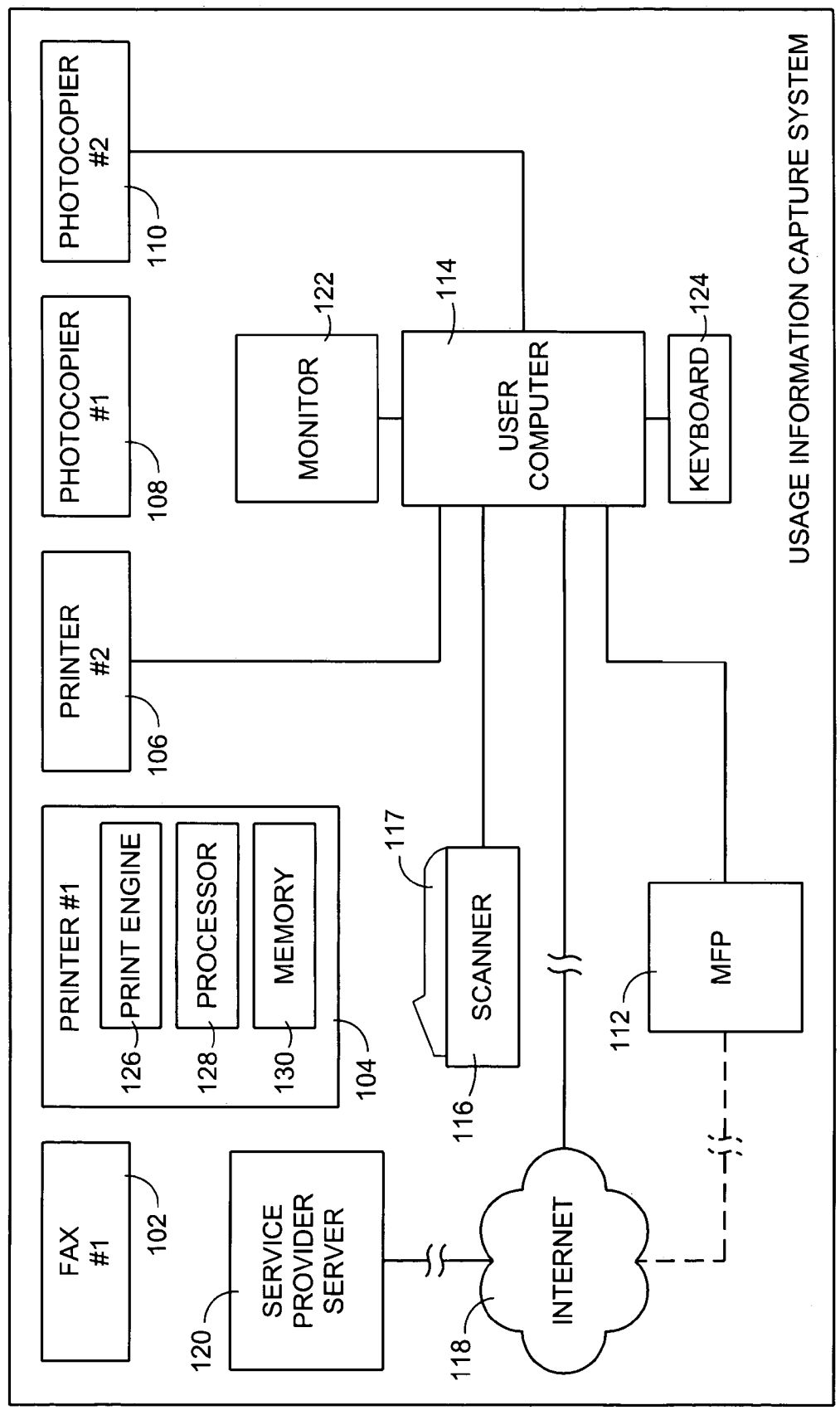
FIG. 1 is a schematic diagram depicting a user environment in which methods and apparatus of the present invention can be practiced.

Methods and apparatus of the present invention, as exemplarily described below and claimed thereafter, can be used to provide a status update report for both networked and non-networked peripheral devices. Certain embodiments of the present invention are useful in providing equipment suppliers and/or service providers with usage information of peripheral devices, such as imaging devices, under control of a user, so that the provider(s) can invoice the user for usage and/or service of the peripheral devices. The term "service provider" will be used hereinafter to refer both to equipment suppliers and/or service providers.

Certain embodiments of the present invention are also useful in providing a user with usage information pertaining to usage of non-networked peripheral imaging devices. Usage information, as used herein, includes, but is not limited to: page count information (i.e., total sheets imaged by the imaging device over the life of the device, or over a selected period of time); the status of consumables such as ink or toner; and the status of components with predetermined replacement or service lives (such as fusers and transfer belts). Usage information can also include additional information not directly pertaining to use of an imaging device, such as the identification of the imaging device (e.g., a serial number of the imaging device generating the status report), and update information such as the date the status report was generated.

As used herein, the terms "peripheral imaging device" and "imaging device" include devices such as printers (e.g., laser printers and/or inkjet printers), photocopiers, facsimile machines, and so-called "multi-function peripherals" (or "MFPs") which incorporate the capabilities of one or more of the afore-recited examples of imaging devices. Imaging devices are configured to receive print jobs from one or more job sources, such as one or more user workstations, and to generate printed images on media, such as paper, in response thereto.

Imaging devices can be "networked" and "non-networked". A "networked imaging device", as that term is used herein, means an imaging device that is capable of electronically transmitting usage information from the imaging device to a user source, such as a user computer, a local server, or another device, (generically, "user computer"), which is capable of storing such usage information. In certain configurations the usage information transmitted to the user source can be subsequently transmitted to a secondary source, such as a secondary server, including a local server and/or a remote server, including a server or computer connected to the Internet. A "non-networked imaging device", as that term is used herein, means an imaging device that is incapable of electronically transmitting usage information from the imaging device to a user source.

In one representative embodiment of the present invention, usage information is captured for a non-networked imaging device by generating a printed status report, which includes the desired usage information, from the non-networked imaging device. The printed status report is then optically scanned, using an optical scanner such as a document scanner, to thereby produce an electronic copy of the printed status report. Thereafter, an optical recognition process is performed on the electronic copy of the status report to identify usage information contained therein. The optically recognized usage information is then converted into digital usage information, which can then be saved in a computer readable memory device. The usage information in the printed status report can be printed as characters on the status report, in which event the optical recognition process can be an optical character recognition ("OCR") process. The usage information in the printed status report can also be printed as bar code on the status report, in which event the optical recognition process is a bar code reading process.

In this way usage information can be extracted from a printed status report (whether printed by a networked or non-networked imaging device), and saved in electronic form. Thereafter, the extracted information can be transmitted to a service provider or other party via (for example) the Internet. Further, the extracted usage information can be combined with an electronic status report generated by a networked imaging device, and the combined information, or parts thereof, can be transmitted to a service provider. The combined information can also be displayed (for example, on a monitor), printed, or archived.

Thus, embodiments of the present invention are useful for capturing and managing usage information of a single non-networked imaging device, or a large number of imaging devices (networked and non-networked) within an office or organization.

Turning now to FIG. 1, a schematic diagram of a system 100 is depicted that can be used to electronically capture usage information from a non-networked imaging device, in accordance with one embodiment of the present invention. The system 100 includes a number of imaging devices, including Fax 102, Printer #1 104, Printer #2 106, Photocopier #1 108, Photocopier #2 110, and MFP ("Multi Function Peripheral") 112. The system 100 also includes a central user computer 114. User computer 114 can be considered as establishing a "network" with respect to imaging devices 106, 110, and 112, which are connected thereto. That is, imaging devices 106, 110 and 112 are "networked imaging devices" with respect to user computer 114. However, since Fax 102, Printer #1 104, and Photocopier #1 108 are not connected to the central user computer 114, these imaging devices (102, 104, 108) are considered as being "non-networked imaging devices", with respect to user computer 114. Printer #1 104 can be, for example, a local user printer in signal communication with a local user computer (not shown), and not the central user computer 114. Typically, the signal communication between a non-networked imaging device (such as Printer #1 104) and a local user computer is established via direct connect (e.g., by a USB, parallel, or serial connection.

The system 100 further includes a scanner 116 that is in signal communication with the user computer 114. As will be described more fully below, the scanner 116 can be used to optically scan printed status reports from one or more of the non-networked imaging devices 102, 104, 108.

As also depicted in FIG. 1, the user computer 114 can be placed in signal communication with the Internet 118, for example, via a modem and a network card/LAN (not shown in FIG. 1), and the Internet 118 can, in turn, be in signal communication with a Service Provider Server 120. In this way, usage information extracted from printed status reports, and saved in a memory device (not shown in FIG. 1) in user computer 114, can be transmitted to a service provider. Further, usage information obtained from electronic status reports from the networked imaging devices 106, 110, 112 can also be transmitted to a service provider.

The user computer 114 can be provided with a user display device (such as monitor 122) as well as a user input device (such as keyboard 124). As will be described more fully below, the user display 122 and the user input device 124 can be used to facilitate capturing usage information from the printed status reports.

It will be appreciated that the scanner 116, the user computer 114, the user display 122, the user input device 124, and the modem (not shown) which allows the user computer 114 to communicate to the Internet 118, can all be functionally located within the MFP 112.

Turning to FIG. 2, an exemplary printed status report 200, that can be used with embodiments of the present invention, is depicted. The printed status report 200 includes the following usage information: the page count ("Total Pages Printed") 202, the Device Serial Number 204, and the Report Date 206. The usage information can also include "Pages Printed Since Last Report" information 203. As depicted, the page count 202, serial number 204, and report date 206 are printed in human-readable form. However, in addition to (or as an alternative to) printing the usage information in human-readable form, the update information can be printed in machine-readable form such as, for example, bar code. For example, bar code 208 can represent the page count, bar code 210 can represent the device serial number, and bar code 212 can represent the report date.

As indicated in FIG. 2, the usage information can be located in predetermined regions of the printed status report 200. For example: the report date 206 is located between coordinates (X1, Y1) and (X2, Y2); the page count 202 is located between coordinates (X3, Y3) and (X4, Y4); the device serial number 204 is located between coordinates (X5, Y5) and (X6, Y6); bar code 208 is located between coordinates (X7, Y7) and (X8, Y8); bar code 210 is located between coordinates (X9, Y9) and (X10, Y10); and bar code 212 is located between coordinates (X11, Y11) and (X12, Y12). The predetermined position information of the usage information 202, 204, 206, 208, 210 and 212 can thus be used by an update routine (described below) to facilitate identification of the usage information for later extraction by the update routine.

Figure 3:
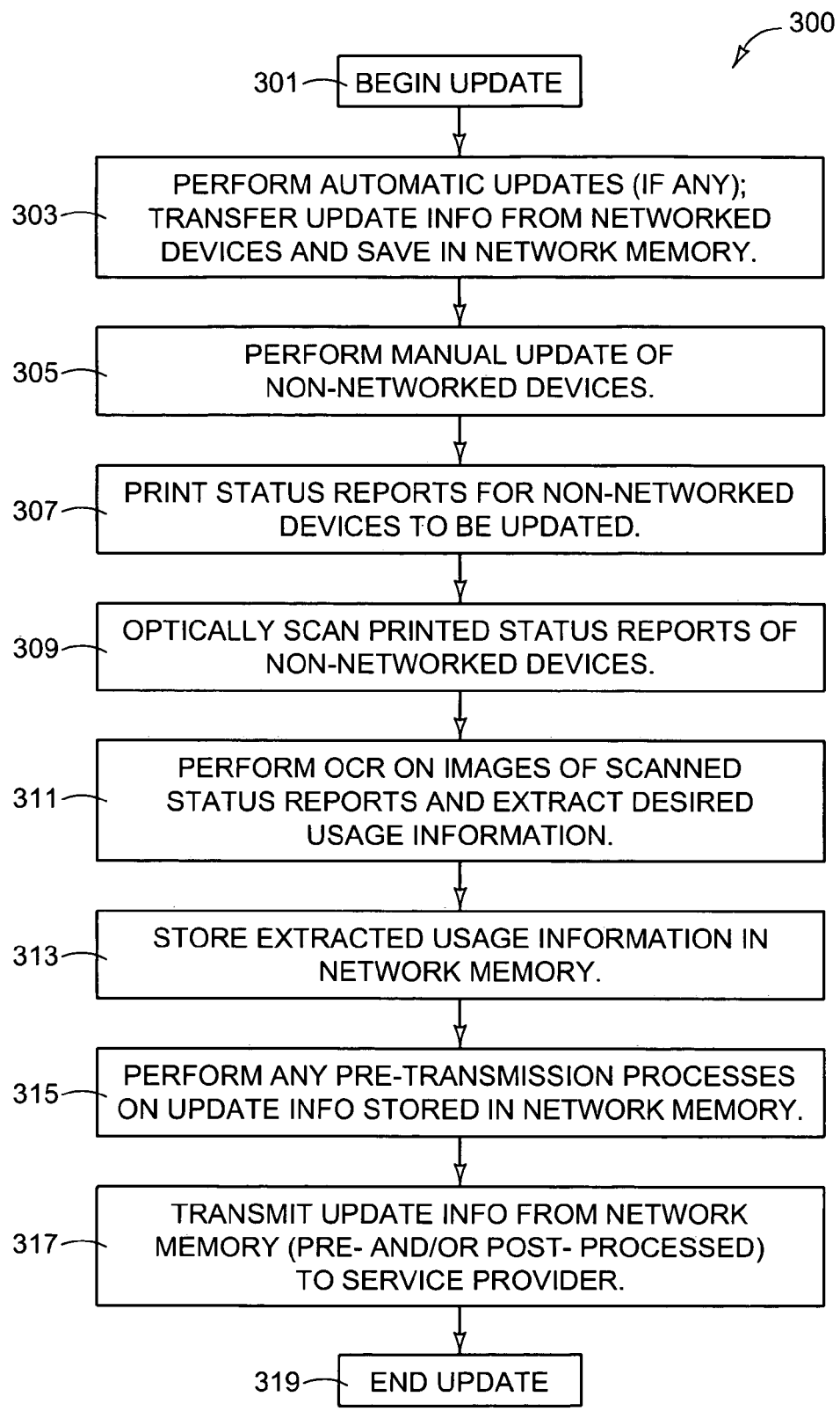
FIG. 3 is a flowchart depicting a method of updating and reporting usage of imaging devices according to one embodiment of the present invention.

Turning now to FIG. 3, a flowchart 300 depicts exemplary steps that can be used to perform a method, in accordance with an embodiment of the present invention. The flowchart 300 depicts a method of collecting and updating usage information for a plurality of imaging devices, such as imaging devices 102, 104, 106, 108, 110 and 112 of FIG. 1. Accordingly, flowchart 300 of FIG. 3 will be described with reference to exemplary system 100 of FIG. 1.

In step 301 of flowchart 300 (FIG. 3), the update process is initiated. The update can be initiated automatically via an update routine (described below), or it can be initiated manually via a user input device, such as keyboard 124 of FIG. 1. In step 303 of flowchart 300 (FIG. 3) automatic updates are performed for any networked imaging devices connected to the network. For example, with reference to FIG. 1, networked imaging devices 106, 110 and 112 send an electronic status report to central user computer 114. The electronic status reports are then stored in network memory (not depicted in FIG. 1, but can be resident within user computer 114).

In step 305 of flowchart 300 (FIG. 3), the manual updating of non-networked imaging devices (such as imaging devices 102, 104, 108, FIG. 1) is performed. More specifically, at step 307 (FIG. 3) status reports for each non-networked imaging device are caused to be generated (printed) by a user, typically by going to each non-networked imaging device and performing the appropriate steps to cause the printed status report to be generated by the respective non-networked imaging device. For example, Printer#1 104 (FIG. 1) can include a keypad with menu options, and one of the menu options can be "Print Status Report." After selecting this option, a status report, e.g., status report 200 of FIG. 2, is generated (printed) by the printer 104.

After all of the printed status reports have been printed by the non-networked imaging devices, then at step 309 the printed status reports for the non-networked imaging devices are optically scanned. More specifically, the printed status reports can be provided to document scanner 116 (FIG. 1) and optically scanned. If the scanner 116 includes an automatic document feeder ("ADF") 117, the printed status reports can all be placed in the ADF and optically scanned sequentially. Following the optical scanning of the printed status reports, electronic copies of the printed status reports are available for further processing.

At step 311 (FIG. 3), optical character recognition ("OCR") is performed on the electronic copies (images) of the printed status reports, and desired usage information is extracted there from. The extracted usage information is stored in the network memory at step 313. The network memory now contains the electronic status reports from the networked imaging devices, as well as the extracted usage information from printed reports from the non-networked imagining devices (collectively, "update information"). Thus, at step 315, the update information can be processed, as desired, prior to further handling of the update information. For example, if the update information is to be provided to a service provider for invoicing purposes, and the invoice is based (at least in part) on the total pages printed by all of the imaging devices (both networked and non-networked), then, at step 315, the page counts extracted from the printed status reports can be combined with the page counts from the electronic status reports, and the total page count saved in the network memory.

At step 317, the desired update information (either as processed in step 315, and/or unprocessed) is transmitted to a service provider. The transfer can be performed, for example, by sending the update information from the user computer 114 (FIG. 1) to the service provider server 120 via the Internet 118. Other functions that can be performed at step 317 (FIG. 3) include: printing the update information (e.g., via Printer #2 106, FIG. 1); displaying the update information via user display 122; and archiving the update information in a computer readable memory device (not shown).

It will be appreciated that the flowchart 300 of FIG. 3 is exemplary only, and that different, fewer or additional steps can be used, all in accordance with embodiments of the present invention. For example, if there are no networked imaging devices, or if none are to be updated, then step 303 can be eliminated. Further, updating of the networked imaging devices does not need to be performed before the updating of the non-networked imaging devices, but can be performed afterwards, or even during the time that the non-networked imaging devices are being updated.

Figure 4:
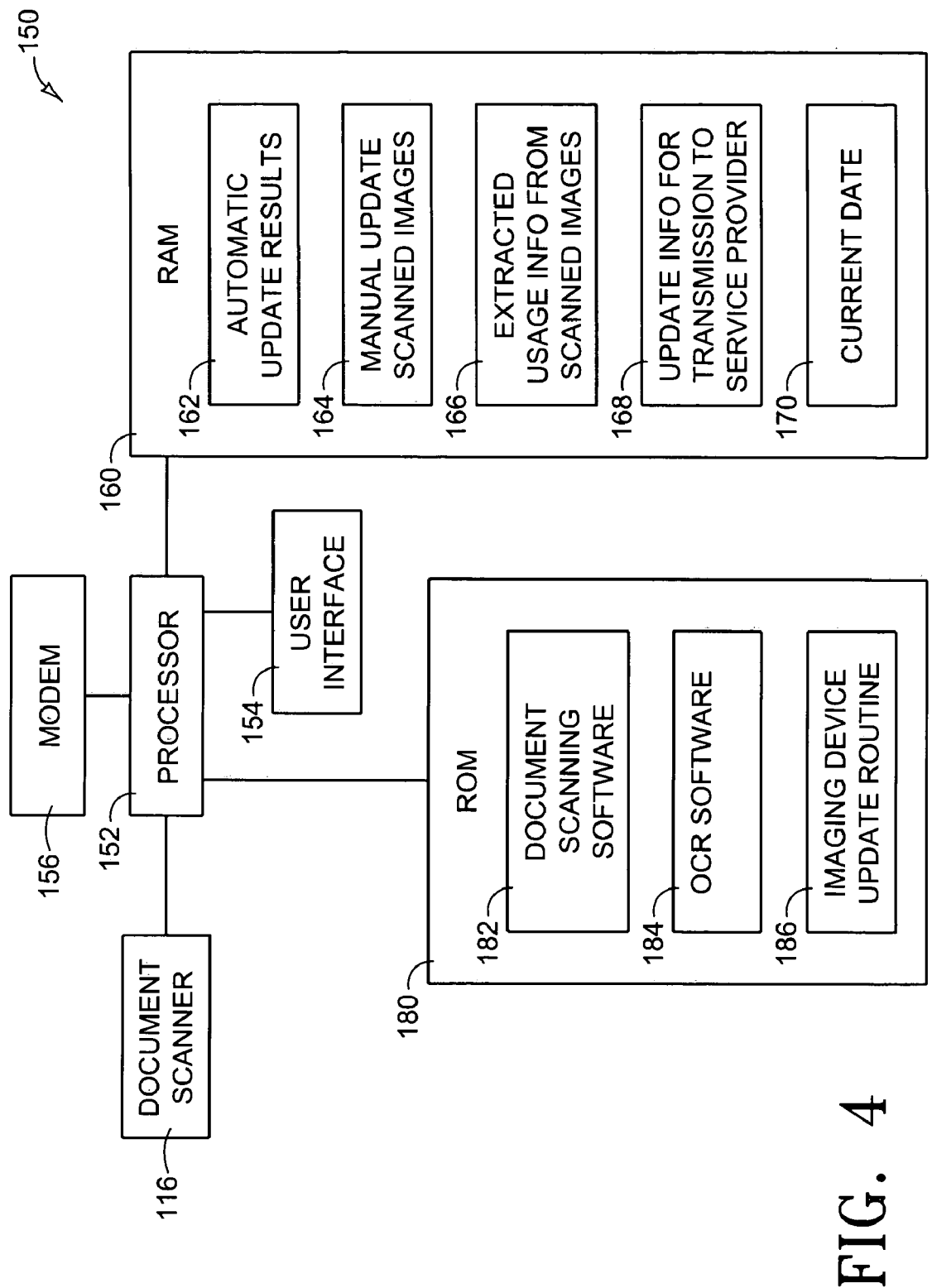
FIG. 4 is a schematic diagram depicting a system for providing a status update for networked and non-networked peripheral devices, in accordance with another embodiment of the present invention.

Turning now to FIG. 4, a schematic diagram depicts additional details of the system 100 of FIG. 1. The system 150 depicted in FIG. 4 includes a processor 152, which can be, for example, resident within user computer 114 of FIG. 1. As depicted in FIG. 4, a user interface 154 is in signal communication with the processor 152. The user interface can be, for example, the monitor 122 and keyboard 124 of FIG. 1. The processor 152 (FIG. 4) is also in signal communication with the document scanner 116, as well as with random access memory (RAM) 160 and read-only memory (ROM) 180. RAM 160 and ROM 180 can be collectively considered as a computer readable memory device, or the "network memory" referred to in the flowchart 300 of FIG. 3. RAM 160 and ROM 180 (FIG. 4) can be located, for example, in user computer 114 (FIG. 1), as well as external thereto. Further, RAM 160 and ROM 180 (FIG. 4) can be distributed among several memory devices, such as semiconductor memory devices, hard drives and other magnetic memory devices, and optical memory devices. Additionally, certain contents of RAM 160 and ROM 180, described below, can be resident within either RAM 160 and ROM 180, or within a unitary memory device, but are described as being resident within either RAM 160 or ROM 180 based upon a representative configuration of the system 150.

As depicted in FIG. 4, RAM 160 can include several allocated memory locations for the following data, as follows. Memory location 162 can be used to store update information (electronic status reports) downloaded from imaging devices connected to the processor 152 (i.e., networked imaging devices). For example, memory location 162 can be used to store the electronic update information collected in step 303 of FIG. 3 from the networked imaging devices 106, 110 and 112 of FIG. 1. Memory location 164 (FIG. 4) can be used to store electronic copies (i.e., scanned images) of printed status reports. For example, memory location 164 can be used to store the optically scanned images of the printed status reports generated at step 309 of FIG. 3 from non-networked imaging devices 102, 104 and 108, FIG. 1. Memory location 166 (FIG. 4) can be used to store usage information extracted from the electronic copies of the printed status reports. For example, memory location 166 can be used to store the usage information extracted at step 311 of FIG. 3, which are stored in memory location 164 (FIG. 4). Memory location 168 can be used to store update information to be transmitted to a service provider, or to be otherwise processed. For example, memory location 168 can be used to store all, or portions, of the electronic status reports generated by the networked imaging devices, as well as all, or portions, of the extracted usage information from the printed status reports. As can be appreciated, portions of memory locations 162, 164, 166 and 168 can be common to one another when common data exists between any two or more memory locations. Further, other memory locations in RAM 160 can be allocated for other uses, such as intermediate processing results.

Still referring to FIG. 4, ROM 180 can include several allocated memory locations for the following programs or routines, as follows. Memory location 182 can be used to store a document scanning program (or software) to control operation of the document scanner 116 via processor 152. The document scanning software 182 can accessed by a user, via user interface 154, to select the resolution of a scanned image, as well as the format in which a scanned image is to be saved, among other things. Document scanning software for use by a document scanner is well known and need not be described further herein. Memory location 184 can be used to store OCR software or other optical recognition software, such as bar code analysis software. More specifically, the OCR software 184 can be applied to an electronic copy of an optically scanned printed status report (rendered by the document scanning software 182) to extract usage information, in a digital form, from the electronic copy of the printed status report.

The expression "usage information in a digital form", as used herein, means usage information in a form that can be numerically processed. For example, "page count information in a digital form" means a binary or hexadecimal number (for example) representing a page count from an imaging device, and that can be added to another binary or hexadecimal number by processor 152. For example, usage information in a digital form, comprising first and second page counts, can be summed by processor 152 to produce a total page count. Usage information in a digital form is to be contrasted with usage information in the electronic copy of an optically scanned printed status report. The latter is typically saved in a digital graphics format, such as a bitmap, and is therefore incapable of being numerically processed to calculate a numerical result.

Memory location 186 of ROM 180 can be used to store an "imaging device update routine". The imaging device update routine 186 can include a series of computer executable steps, executable by the processor 152, to perform a status update such as that depicted in the flowchart 300 of FIG. 3. Accordingly, the computer executable steps contained within the imaging device update routine 186 of FIG. 4 are configured to cause the document scanner 116 (under the control of the document scanning software 182) to optically scan a printed status report generated by non-networked imaging devices (e.g., imaging devices 102, 104 and 108, FIG. 1) to thereby produce an electronic copy of the optically scanned printed status reports. The computer executable steps of the imaging device update routine (186, FIG. 4) are further configured to cause the processor 152 to optically recognize (under the control of the optical recognition software 184) usage information contained within the electronic copy of the optically scanned printed status reports, and to therein convert the optically recognized usage information into digital usage information. The imaging device update routine 186 can then cause the processor 152 to store the digital usage information to the computer readable memory (RAM memory location 166).

The imaging device update routine 186, or the optical recognition software 184 under the control of the update routine 186, can include executable steps to cause the processor 152 to optically recognize the usage information (contained within the electronic copy of the optically scanned printed status report) using an optical character recognition process, and/or a bar code recognition process. For example, if the page count usage information is presented on the printed update report as characters, as indicated by item 202 of FIG. 2, then the imaging device update routine 186 can cause the OCR software 184 (FIG. 4) to optically recognize the number "6870" as the page count. On the other hand, if the page count usage information is presented on the printed update report as bar code, as indicated by item 208 of FIG. 2, then the imaging device update routine 186 can cause the optical recognition software 184 (FIG. 4) to optically recognize the number represented by the bar code 208 (FIG. 2) as the page count value.

It will be appreciated that the document scanning software 182, the optical recognition software 184, and the imaging device update routine 186 of FIG. 4, and components thereof, can all be combined into a single program or software applications package.

The system 150 (FIG. 4) can be part of the system 100 of FIG. 1, in which case the processor 152 (FIG. 4) can be in signal communication with networked imaging devices (such as imaging devices 106, 110 and 112, FIG. 1). In this case, the networked imaging devices (106, 110, 112, FIG. 1) can be configured to transmit electronic status reports to the processor 152 (FIG. 4). The series of computer executable steps of the imaging device update routine 186 can then be further configured to cause the processor 152 to save the electronic status report in RAM memory location 162.

When the system 150 (FIG. 4) includes modem 156, the series of computer executable steps of the imaging device update routine 186 can be further configured to cause the processor 152 to transmit the digital usage information 166, as well as other update information (e.g., update information 168) from the computer readable memory (RAM 160) to a service provider server (e.g., item 120, FIG. 1) via the modem 156 (FIG. 4). It will be appreciated that modem 156 can comprise any device configured to place the processor 152 into data communication with a processor external to, and not in direct signal communication with, processor 152. For example, modem 156 can be a dial-up modem, a high speed Internet modem, or a switch for connecting to a computer or server not in direct communication with the processor 152.

The series of computer executable steps of the imaging device update routine 186 can be further configured to cause the processor 152 to prompt a user, via the user display 122 (FIG. 1) for example, to generate the printed status report using the non-networked imaging device (e.g., non-networked imaging devices 102, 104, 108, FIG. 1). That is, the imaging device update routine 186 can be configured to check an internal clock (such as "current date" clock 170 in RAM 160) for periodicity of update reports (e.g., every month, every calendar quarter, etc.) and, upon determining that an update report is due, to prompt a user, via user interface 154, to generate printed status reports (e.g., report 200, FIG. 2) from non-networked imaging devices (e.g., imaging devices 102, 104, 108, FIG. 1) and proceed with additional steps (described more fully below) to facilitate extraction of usage information from the printed status reports for use in reporting updated status of the non-networked imaging devices.

The imaging device update routine 186 can be further configured to cause the processor 152 to prompt the user, via the user display 122 (FIG. 1), to optically scan the printed status reports using the document scanner 116. For example, if the document scanner 116 includes a document feeder 117, then the imaging device update routine 186 can display to the user, via the user display 122, a message to place the printed status reports in the automatic document feeder 117. The computer executable steps of the imaging device update routine 186 (FIG. 4) can be further configured such that, once one or more printed status reports are placed in the ADF 117 (FIG. 1), the scanner 116 signals the processor 152 (FIG. 4) to indicate the presence of documents in the ADF (117, FIG. 1), and the imaging device update routine 186 (FIG. 4) thereafter automatically performs the steps of optically scanning the printed status reports, optically recognizing usage information from the electronic copy of the optically scanned printed status report, converting the optically recognized usage information into digital usage information, and saving the digital usage information to the computer readable memory (RAM location 166).

As indicated above, the printed status report (200, FIG. 2) can include a date ("Report Date", 206) that the status report 200 was generated by the non-networked imaging device (e.g., imaging device 102, 104, 108, FIG. 1). In this case, the series of computer executable steps of the imaging device update routine 186 (FIG. 4) can be further configured to cause the processor 152 to identify the date that the printed status report 200 (FIG. 2) was generated, as part of the digital usage information, and to compare the date that the printed report 200 was generated with a current date (e.g., "Current Date" 170 in RAM 160, FIG. 4).

When the imaging device update routine 186 (under control of processor 152) determines that the date that the printed status report 200 (FIG. 2) was generated is not the same as the current date (170, FIG. 4), then the imaging device update routine 186 (under control of processor 152) can notify the user, via the user display (monitor 122, FIG. 1). The notification to the user can be in the form of a message, displayed via the user interface 154 (FIG. 4), that the update process has been halted with respect to an identified non-networked imaging device due to the fact that the printed status report is not current. The notification can further prompt the user to generate a current printed status report from the indicated non-networked imaging device and resubmit the current printed status report to the scanner 116.

In the case that the date the printed status report 200 (FIG. 2) was generated is not the same as the current date (170, FIG. 4), then the imaging device update routine 186 can instruct the processor 152 to halt any automatic saving of digital usage information (extracted from the electronic copy—i.e., the scanned image) to the memory 166.

As indicated above with respect to FIG. 2, the printed status report 200 can include a serial number 204 of the non-networked imaging device that printed the status report 200. In this case, the series of computer executable steps in the imaging device update routine 186 (under control of processor 152) can be further configured to cause the processor 152 to identify the serial number as part of the digital usage information extracted from the electronic copy of the status report (typically stored in RAM memory location 164). That is, the imaging device update routine 186, under control of processor 152, can instruct the optical recognition software 184 to extract the serial number of the non-networked imaging device that was used to generate the printed status report, and to save the extracted serial number in RAM memory location 166.

With reference to FIG. 2, it will be appreciated that the optical recognition software 184 (FIG. 4), under the control of the processor 152 and the imaging device update routine 186, can extract computer-readable field identification information from the printed status report 200 (FIG. 2), as well as computer-readable numerical information from the printed status report 200. For example, with respect to the "Total Pages Printed" usage information 202, the imaging device update routine 186 can be configured to extract the field identification information "Total Pages Printed" in computer-readable form, such as ASCII, along with the page count value "6870" in a numerical form. Alternately, the imaging device update routine 186 can be configured to extract only the page count value "6870" in a numerical form.

The information extracted from the electronic copy of the printed status report by the imaging device update routine 186 will typically be governed by the manner in which update information is to be provided to a service provider server (120, FIG. 1), or presented to a user via a user display 122, or printed in a usage report, as for example by Printer #2 106. When only numerical information is required as the digital usage information, then the coordinates identifying the usage information on the printed status report can be set to only include such numerical information. For example, with respect to FIG. 2, if only the total page count number is desired to be extracted from the printed status report 200, then the coordinates used to identify the desired information are (X3', Y3) and (X4, Y4), and not (X3, Y3) and (X4, Y4).

Figure 5B:
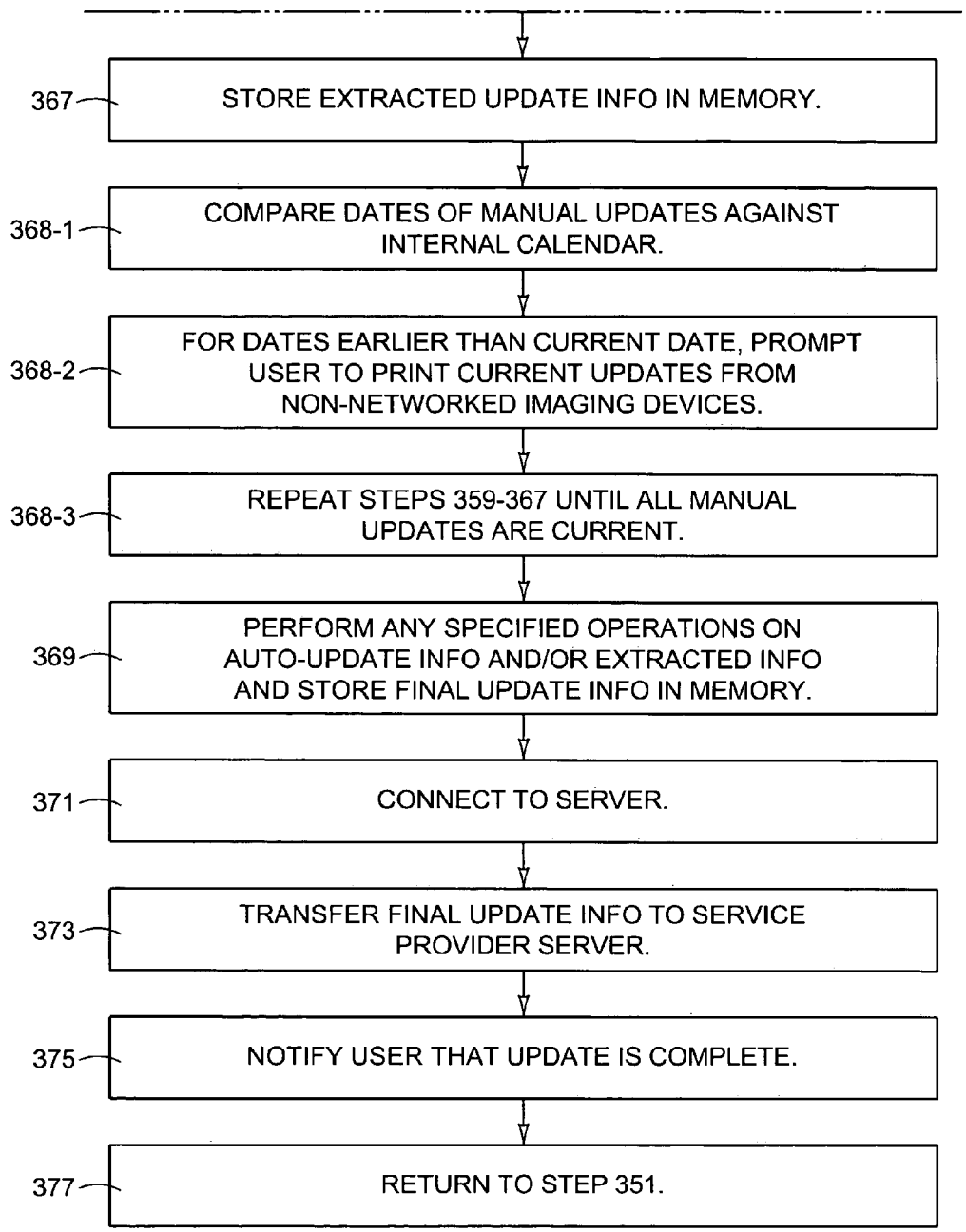

FIG. 5 is a legend showing how FIGS. 5A and 5B are related. FIGS. 5A and 5B together form a flowchart 350 depicting exemplary steps that can be performed by the imaging device update routine 186 of FIG. 4. Beginning at step 351 (FIG. 5A), the processor 152 (FIG. 4), under the control of the imaging device update routine 186, checks an internal clock/calendar (e.g., "Current Date" calendar 170 in RAM 160) to determine if a service update is due for networked and/or non-networked imaging devices. For purposes of the example provided in FIGS. 5A and 5B, it will be assumed that the update process is being performed for a system such as the system 100 of FIG. 1, which includes both networked imaging devices 106, 110 and 112, as well as non-networked imaging devices 102, 104 and 108. If it is determined at step 351 (FIG. 5A) that a service update is due, then, at step 353, the imaging device update routine 186 (FIG. 4), via the processor 152 and the user interface 154, displays a "Service Update Menu" to the user. As indicated at step 355 (FIG. 5A), the "Service Update Menu" can include a dialog window to allow the user to activate auto-update for networked imaging devices, as for example by allowing the user to select or mouse-click on an "update now" button. The dialog window can also allow the user to select "update later", in which case the dialog box is closed and the "Service Update Menu" is later represented to the user (e.g., 24 hours after selecting the "update later" option). If the "update now" option is selected by the user, then, at step 357, update information from networked imaging devices (106, 110, 112, FIG. 1) is downloaded from the indicated imaging devices, and the auto-update information is stored in computer readable memory (e.g., in memory location 162 of RAM 160, FIG. 4).

Upon completion of the "auto update" portion of the update process (per step 357, FIG. 5A), at step 359 the imaging device update routine 186 (FIG. 4), via the processor 152 and the user interface 154, displays a dialog window to the user to prompt the user to print manual update information (printed status reports, e.g., printed status report 200, FIG. 2) from non-networked imaging devices (102, 104, 108, FIG. 1) and to click "continue" after the manual information (printed status reports) has been printed. Upon receipt of a "continue" signal (resulting from the user selecting or mouse-clicking on a "continue" selection), at step 361 (FIG. 5A), the imaging device update routine 186 (FIG. 4), via the processor 152 and the user interface 154, prompts the user to insert the manual update printouts (printed status reports) in document feeder 117 (FIG. 1) of the document scanner 116.

At step 363 (FIG. 5A), the imaging device update routine 186 (FIG. 4), via the processor 152, checks the scanner 116 (FIG. 1) for the presence of documents in the document scanner feeder 117. When the presence of documents is detected within the document feeder 117, the imaging device update routine 186 (FIG. 4), via the processor 152, enables the document scanner software 182 to automatically scan the documents (printed status reports) and store the scanned images (electronic copies of the printed status reports) in memory 164. Once the scanned images of the printed status reports are saved at step 363 (FIG. 5A), then, at step 365, the imaging device update routine 186 (FIG. 4), via the processor 152, causes the optical recognition software 184 to perform optical recognition (OCR and/or bar code analysis) on the scanned images to extract the desired usage information for the update being performed, and, at step 367 (FIG. 5B), to save the extracted update information to memory location 166 (FIG. 4).

The imaging device update routine 186 (FIG. 4), via the processor 152, can also performs steps 368-1, 368-2, and 368-3 (FIG. 5B) to compare the dates of the manual updates (indicated, for example as the "Report Date" 206 of the printed status report 200 of FIG. 2) to an internal current date (170, FIG. 4). For report dates (206, FIG. 2) earlier than the current date (170, FIG. 4), the imaging device update routine 186 (FIG. 4), via the processor 152 and the user interface 154, can prompt user to print current updates for the indicated non-networked imaging devices and to resubmit the current printed updates per steps 359-367 (FIGS. 5A and 5B), described above.

Thereafter, at step 369 (FIG. 5B), any desired processing of the update information (including the auto-update information (electronic status reports from networked imaging devices) stored in memory location 162 (FIG. 4), and usage information extracted from the printed status reports stored in memory location 166), can be performed and stored in memory location 168. For example, the imaging device update routine 186 can specify that a total page count for all imaging devices being updated can be combined into a single value and stored in memory location 168 as update information to be transmitted to a service provider. In this case, the page count(s) stored in memory location 162 for the networked imaging devices can be added to the page count(s) for the non-networked imaging devices stored in memory location 166, and the sum can be stored in memory location 168. Other processing of the usage information from the networked and non-networked imaging devices can be performed at this stage, and the results stored in memory location 168.

At step 371 (FIG. 5B), the processor 152 (FIG. 4) can be connected to a service provider server (e.g., server 120, FIG. 1) via modem 156 (FIG. 4), and at step 373 (FIG. 5B) the final update information (from memory location 168, FIG. 4) can be transferred to the service provider's server (120, FIG. 1). At step 375 (FIG. 5B) the transfer of the update information (from memory location 168, FIG. 4) to the service provider's server (120, FIG. 1) is complete, at which time, at step 375 (FIG. 5B) the user is notified, via the user interface 154 (FIG. 4) that the update has been completed. Thereafter, at step 377 (FIG. 5B), the imaging device update routine 186 (FIG. 4), under the control of the processor 152, is returned to step 351 (FIG. 5A) to monitor the internal calendar/clock 170 (FIG. 4) to determine if a service update is due.

A further embodiment of the present invention, as depicted in FIG. 1, provides for an imaging device 104 including a print engine 126, a processor 128 in signal communication with the print engine, and a computer readable memory 130 in signal communication with the processor 128. The computer readable memory 130 contains a series of computer executable steps (executable by the processor 128) configured to cause the processor 128 to print, using the print engine 126, a status report wherein usage information pertaining to usage of the imaging device is printed in at least one predetermined region of the printed status report. For example, with respect to FIG. 2, the imaging device 104 (FIG. 1) will always print the page count usage information at coordinates (X3, Y3) through (X4, Y4) (or (X3', Y3) through (X4, Y4)).

This is to be contrasted with prior art printed status reports, where the location of usage information within a printed status report can be variable depending on other factors, such as additional information which can be added to, or deleted from, the printed status report, or the length of a particular item reported in the printed status report. Furthermore, the usage information in the printed status report printed by the imaging device 104 can be printed in a plurality of predetermined regions of the printed status report. For example, with respect to the exemplary printed status report 200 of FIG. 2, page count information 202 is printed in a first predetermined region (X3, Y3) through (X4, Y4) (or (X3', Y3) through (X4, Y4)) of the printed status report, serial number information 204 is printed in a second predetermined region ((X5, Y5) through (X6, Y6)) of the printed status report 200, and date of report information (206) is printed in a third predetermined region ((X1, Y1) through (X2, Y2)) of the printed status report 200.

The series of computer executable steps in the computer readable memory 130 can be further configured to cause the processor 128 to print on the printed status report (200, FIG. 2), using the print engine 126 (FIG. 1), an orientation identifier for the printed status report. For example, the orientation identifier can be the logo 214 (FIG. 2), or the directional arrow 215. Thus, in step 361 of the flowchart 350 of FIG. 5A, when the imaging device update routine 186 (FIG. 4), via the processor 152 and the user interface 154, prompts the user to insert the manual update printouts in document feeder 117 (FIG. 1), the prompt can include a message such as: "Insert printed update report to ADF with HP logo located towards ADF in-feed position" (in the case of the orientation identifier being the logo 214 of FIG. 2); or "Insert printed update report to ADF in direction indicated by arrow in top margin of printed update report" (in the case of the orientation identifier being the arrow 215 of FIG. 2). The use of the orientation identifier 214, 215 can thus facilitate the optical recognition software (184, FIG. 4) in being able to locate, from the scanned electronic image of the printed update report, the update information contained in the predetermined areas of the original printed update report (200, FIG. 2). In one variation, rather than providing an orientation identifier on the printed update report, the update information can be printed on the report in vertically mirrored locations so that regardless of the direction the printed update report is placed in the ADF 117 (FIG. 1), the update information will be capable of being retrieved from the predetermined areas.

The series of computer executable steps in the computer readable memory 130 can be further configured to cause the processor 128 to print on the printed status report (200, FIG. 2), using the print engine 126 (FIG. 1), the usage information on the printed status report in the form of barcode (e.g., barcodes 208, 210, 212, FIG. 2) and/or optically recognizable characters (202, 204, 206).

In one variation on the present invention, rather than printing the usage information in one or more predetermined regions of the printed status report (as described above, and particularly with respect to FIG. 2), the imaging device update routine (186, FIG. 4) can be configured to cause the OCR software 184 to perform optical character recognition on the entire electronic copy of the optically scanned printed status report (e.g., report 200, FIG. 2, as stored in memory location 164, FIG. 4). The imaging device update routine 186 can be further configured to cause the OCR software 184 to search for specifically identified terms such as "page count", "report date", and "serial number". Upon identifying such terms, the imaging device update routine 186 can then cause the processor 152 to search within proximate regions of the found term (e.g., immediately to the right of the found term, or immediately below the found term) for a data value that corresponds to the found term.

For example, if the search term is "page count" or "pages printed", and the processor 152 identifies the region (X3, Y3) through (X3", Y4) as containing the term, then the imaging device update routine (186, FIG. 4) can be configured to cause the processor 152 to search the area to the right of, and immediate below, region (X3, Y3) through (X3", Y4) for a numerical value having a configuration of "NNNNNN", wherein each value "N" is a numerical value, and not an alpha character (e.g., "a", "b", "c", etc.) nor a punctuation character (e.g., "$", "/", "%", etc.). When a numerical value conforming to the search criteria is found and satisfies the search criteria, this numerical value will be assigned as the "page count" for the update information. A similar search criteria can be used for the report date (206, FIG. 2), the imaging device serial number (204), etc. In this way a variety of different printed update reports can be processed by the imaging device update routine 186 to thereby extract the desired usage information therefrom.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of electronically capturing usage information from a non-networked imaging device, comprising:
   generating a printed status report, including the usage information, from the non-networked imaging device;
   optically scanning the printed status report to thereby produce an electronic copy of the optically scanned printed status report;
   optically recognizing, from the electronic copy of the optically scanned printed status report, the usage information contained therein;
   converting the optically recognized usage information into digital usage information; and
   saving the digital usage information to a computer readable memory device.

2. The method of claim 1, and wherein:
   the usage information is rendered in the printed status report in the form of characters; and
   optically recognizing the usage information comprises performing optical character recognition ("OCR") on the characters to electronically extract the usage information from the electronic copy of the optically scanned printed status report, and thereby produce the optically recognized usage information.

3. The method of claim 1, and wherein:
   the usage information is rendered in the printed status report in the form of one or more bar codes; and
   optically recognizing the usage information comprises bar code scanning the one or more bar codes to electronically extract the usage information therefrom, and thereby produce the optically recognized usage information.

4. The method of claim 1, and wherein the usage information includes a page count of pages printed by the non-networked imaging device.

5. The method of claim 4, and wherein the status report includes at least one of a serial number identifying the non-networked imaging device, and a date of the status report.

6. The method of claim 1, and wherein the usage information is located within one or more predefined areas of the printed status report.

7. The method of claim 1, and further comprising transmitting the digital usage information to a service provider server.

8. The method of claim 1, and further comprising:
   generating an electronic status report from a networked imaging device; and
   saving the electronic status report to the computer readable memory device.

9. The method of claim 8, and further comprising transmitting the digital usage information and at least a part of the electronic status report to a service provider server.

10. The method of claim 1, and wherein the printed status report includes a date that the printed status report was printed, the method further comprising:
    comparing the date that the printed status report was printed against a current date; and wherein saving the digital usage information to a computer readable memory device is only performed if the date that the printed status report was printed and a current date are the same.

11. The method of claim 10, and further comprising, when the date that the printed status report was printed and the current date are not the same, notifying a user.

12. A system to electronically capture usage information from a non-networked imaging device, comprising:
   a document scanner;
   a processor in signal communication with the document scanner; and
   a computer readable memory in signal communication with the processor, the computer readable memory containing a series of computer executable steps configured to:
      cause the document scanner to optically scan a printed status report generated by the non-networked imaging device to thereby produce an electronic copy of the optically scanned printed status report;
      cause the processor to optically recognize, from the electronic copy of the optically scanned printed status report, usage information contained therein;
      cause the processor to convert the optically recognized usage information into digital usage information; and
      save the digital usage information to the computer readable memory.

13. The system of claim 12, and wherein the computer executable step configured to cause the processor to optically recognize the usage information is an optical character recognition process.

14. The system of claim 12, and wherein the computer executable step configured to cause the processor to optically recognize the usage information is a bar code recognition process.

15. The system of claim 12, and further comprising a networked imaging device in signal communication with the processor, and wherein:
   the networked imaging device is configured to transmit an electronic status report to the processor; and
   the series of computer executable steps are further configured to cause the processor to save the electronic status report in the computer readable memory.

16. The system of claim 12, and further comprising a modem, and wherein the series of computer executable steps are further configured to cause the processor to transmit the digital usage information from the computer readable memory to a service provider server via the modem.

17. The system of claim 12, and further comprising a user display, and wherein the series of computer executable steps are further configured to cause the processor to periodically prompt a user, via the user display, to generate the printed status report using the non-networked imaging device.

18. The system of claim 17, and wherein the series of computer executable steps are further configured to cause the processor to prompt the user, via the user display, to scan the printed status report using the document scanner.

19. The system of claim 18, and wherein the document scanner comprises an automatic document feeder, and prompting the user to scan the printed status report comprises displaying, on the user display, a message to place the printed status report in the automatic document feeder.

20. The system of claim 19, and wherein the series of computer executable steps for optically scanning the printed status report, optically recognizing usage information from the electronic copy of the optically scanned printed status report, converting the optically recognized usage information into digital usage information, and saving the digital usage information to the computer readable memory are configured to be performed automatically after the printed status report has been placed in the automatic document feeder.

21. The system of claim 12, and further comprising a user display, and wherein:
   the printed status report comprises a date that the report was generated by the non-networked imaging device; and
   the series of computer executable steps are further configured to cause the processor to:
      identify the date that the report was generated as part of the digital usage information;
      compare the date that the report was generated with a current date; and
      when the date that the report was generated is not the same as the current date, notify a user, via the user display.

22. The system of claim 12, and wherein:
   the printed status report comprises a serial number of the non-networked imaging device; and
   the series of computer executable steps are further configured to cause the processor to identify the serial number part of the digital usage information.

23. An imaging device, comprising:
   a print engine;
   a processor in signal communication with the print engine; and
   a computer readable memory in signal communication with the processor, the computer readable memory containing a series of computer executable steps configured to cause the processor to print, using the print engine, a status report wherein usage information pertaining to usage of the imaging device is printed in at least one predetermined region of the printed status report; and
   wherein the usage information comprises page count information printed in a first predetermined region of the printed status report, and serial number information printed in a second predetermined region of the printed status report.

24. An imaging device, comprising:
   a print engine;
   a processor in signal communication with the print engine; and
   a computer readable memory in signal communication with the processor, the computer readable memory containing a series of computer executable steps configured to cause the processor to print, using the print engine, a status report wherein usage information pertaining to usage of the imaging device is printed in at least one predetermined region of the printed status report; and
   wherein the usage information further comprises date of report information printed in a third predetermined region of the printed status report.

25. An imaging device, comprising:
   a print engine;
   a processor in signal communication with the print engine; and
   a computer readable memory in signal communication with the processor, the computer readable memory containing a series of computer executable steps configured to cause the processor to print, using the print engine, a status report wherein usage information pertaining to usage of the imaging device is printed in at least one predetermined region of the printed status report; and wherein the series of computer executable steps are further configured to cause the processor to print, using the print engine, an orientation identifier for the printed status report.

26. A system to electronically capture usage information from a non-networked imaging device, comprising:

document scanning means;

signal processing means in signal communication with the document scanning means; and memory means in signal communication with the signal processing means, the memory means containing a series of computer executable steps configured to:

cause the document scanning means to optically scan a printed status report generated by the non-networked imaging device to thereby produce an electronic copy of the optically scanned printed status report;

cause the signal processing means to optically recognize, from the electronic copy of the optically scanned printed status report, usage information contained therein;

cause the signal processing means to convert the optically recognized usage information into digital usage information; and save the digital usage information to the memory means.

27. The system of claim 26, and further comprising a networked imaging means in signal communication with the signal processing means, and wherein:

the networked imaging means is configured to transmit an electronic status report to the signal processing means; and the series of computer executable steps are further configured to cause the signal processing means to save the electronic status report in the memory means.

28. The system of claim 26, and wherein the computer executable step configured to cause the signal processing means to optically recognize the usage information is one of an optical character recognition process or a bar code recognition process.

29. The system of claim 26, and further comprising a data transmitting means, and wherein the series of computer executable steps are further configured to cause the signal processing means to transmit the digital usage information from the memory means to a service provider server via the data transmitting means.

* * * * *

UNITED STATES PATENT AND TRADEMARK OFFICE
CERTIFICATE OF CORRECTION

| | | |
|---|---|---|
| PATENT NO. | : 7,315,713 B2 | Page 1 of 1 |
| APPLICATION NO. | : 10/742298 | |
| DATED | : January 1, 2008 | |
| INVENTOR(S) | : Travis J. Parry et al. | |

It is certified that error appears in the above-identified patent and that said Letters Patent is hereby corrected as shown below:

In column 15, line 14, in Claim 12, delete "with-the" and insert -- with the --, therefor.

Signed and Sealed this

Third Day of June, 2008

JON W. DUDAS
*Director of the United States Patent and Trademark Office*